United States Patent
Rasras

(10) Patent No.: US 9,122,085 B2
(45) Date of Patent: Sep. 1, 2015

(54) THERMALLY CONTROLLED SEMICONDUCTOR OPTICAL WAVEGUIDE

(75) Inventor: Mahmoud S. Rasras, Berkeley Heights, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 411 days.

(21) Appl. No.: 12/944,946

(22) Filed: Nov. 12, 2010

(65) Prior Publication Data

US 2012/0087613 A1    Apr. 12, 2012

Related U.S. Application Data

(60) Provisional application No. 61/390,876, filed on Oct. 7, 2010, provisional application No. 61/390,837, filed on Oct. 7, 2010, provisional application No. 61/390,840, filed on Oct. 7, 2010, provisional application No. 61/390,798, filed on Oct. 7, 2010.

(51) Int. Cl.
    *G02F 1/01*     (2006.01)
    *G02F 1/035*     (2006.01)
    *G02F 1/295*     (2006.01)
    *G02F 1/225*     (2006.01)
    *G02F 1/21*     (2006.01)

(52) U.S. Cl.
    CPC ............ *G02F 1/0147* (2013.01); *G02F 1/2257* (2013.01); *G02F 2001/212* (2013.01); *G02F 2201/063* (2013.01); *G02F 2203/48* (2013.01)

(58) Field of Classification Search
    CPC . G02F 1/225; G02F 2001/212; G02F 1/0147; G02F 2201/126
    USPC .............................. 385/1–8, 14, 40, 131, 132
    See application file for complete search history.

(56) References Cited

U.S. PATENT DOCUMENTS

| | | |
|---|---|---|
| 5,212,745 A | 5/1993 | Miller |
| 6,700,910 B1 | 3/2004 | Aoki et al. |
| 6,925,217 B2 * | 8/2005 | Yamazaki et al. .............. 385/14 |
| 7,035,505 B2 | 4/2006 | Shen et al. |
| 7,158,699 B2 | 1/2007 | Welch et al. |
| 7,321,702 B2 * | 1/2008 | Akiyama et al. .................. 385/3 |
| 7,565,038 B2 | 7/2009 | Earnshaw |
| 7,616,850 B1 | 11/2009 | Watts et al. |

(Continued)

FOREIGN PATENT DOCUMENTS

WO      2009032820 A1      3/2009

OTHER PUBLICATIONS

M. G. Young, et al., "A 16 X 1 Wavelength Division Multiplexer with Integrated Distributed Bragg Reflector Lasers and Electroabsorption Modulators", IEEE Photonics Technology Letters, vol. 5, No. 8, Aug. 1993, pp. 908-910.

(Continued)

*Primary Examiner* — Kaveh Kianni
*Assistant Examiner* — Hung Lam
(74) *Attorney, Agent, or Firm* — Hitt Gaines, PC

(57) ABSTRACT

An apparatus includes a conductive or semiconductive substrate and a dielectric layer located directly thereon. A semiconductor layer is located directly on the dielectric layer. The semiconductor layer includes a ridge waveguide and a heater strip extending parallel to the ridge waveguide. The heater strip is electrically isolated from the ridge waveguide and is doped to carry a current therein about parallel to the ridge waveguide.

18 Claims, 13 Drawing Sheets

(56) References Cited

U.S. PATENT DOCUMENTS

Figure 1:
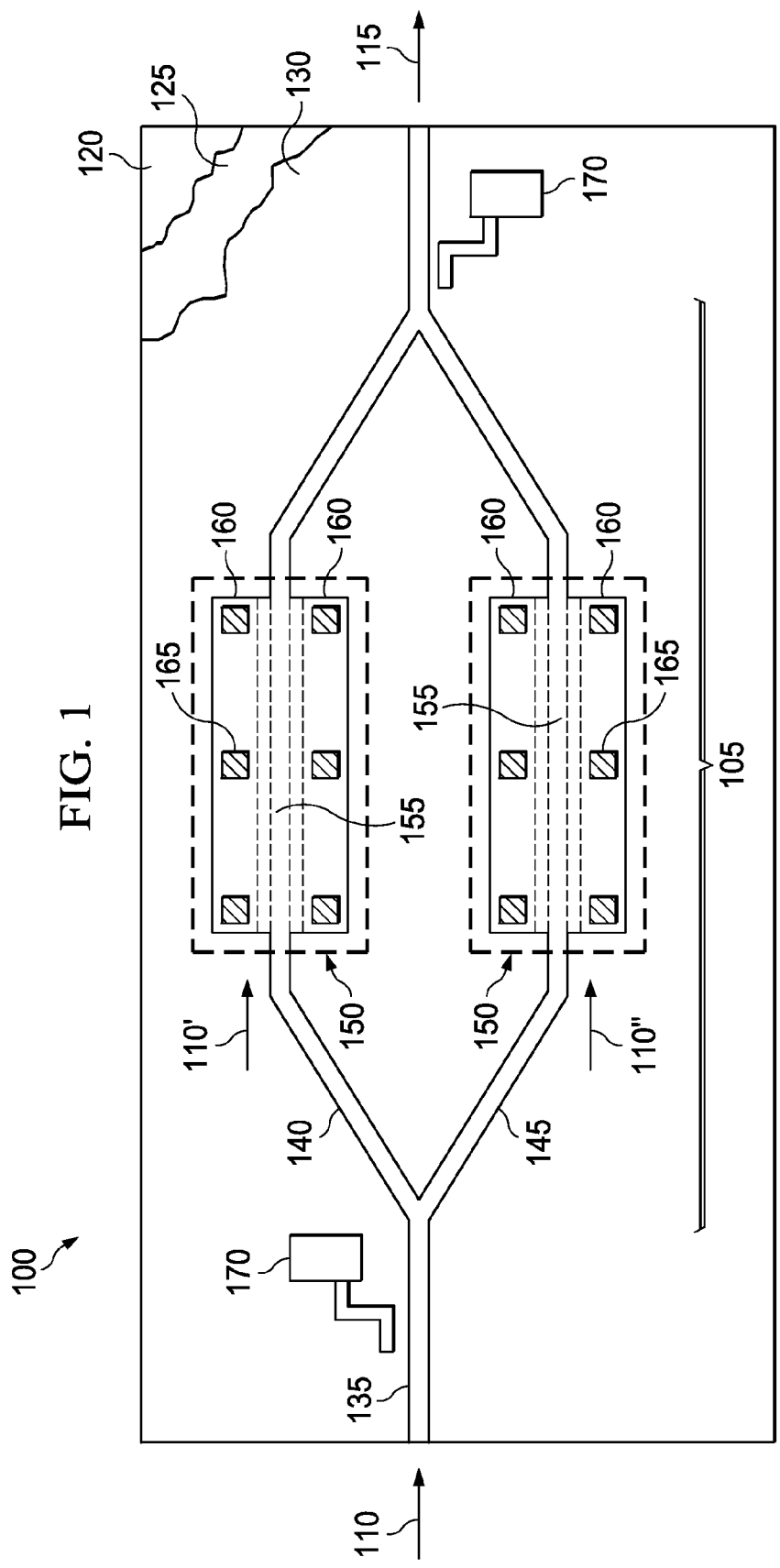

| | | | |
|---|---|---|---|
| 2002/0197010 | A1 | 12/2002 | Kato et al. |
| 2003/0057428 | A1* | 3/2003 | Day .............................. 257/98 |
| 2003/0081878 | A1 | 5/2003 | Joyner et al. |
| 2004/0141691 | A1 | 7/2004 | Wiesmann et al. |
| 2004/0264836 | A1* | 12/2004 | Kawashima et al. ........... 385/14 |
| 2005/0213883 | A1 | 9/2005 | Welch et al. |
| 2007/0292075 | A1* | 12/2007 | Montgomery et al. ......... 385/14 |
| 2009/0103924 | A1* | 4/2009 | Kawanishi et al. ........... 398/115 |
| 2010/0247021 | A1 | 9/2010 | Cunningham et al. |
| 2010/0247022 | A1 | 9/2010 | Li et al. |
| 2010/0247029 | A1 | 9/2010 | Li et al. |
| 2011/0103415 | A1 | 5/2011 | Rasras |

OTHER PUBLICATIONS

Yiu-Man Wong, et al., Technology Development of a High-Density 32-Channel 16-Gb/s Optical Data Link for Optical Interconnection Applications for the Optoelectronic Technology Consortium (OETC), J. of Lightwave Technology, vol. 13, No. 6, Jun. 1995, pp. 995-1016.

C. R. Doerr, et al, "Monolithic Silicon Coherent Receiver", 2009 OSA/OFC/NFOEC 2009, PDPB2.pdf (2009), 3 pgs.

Gu, Lanlan, et al., "Silicon-On-Insulator-Based Photonic-Crystal Mach-Zehnder Interferometers", Proc. of SPIE, vol. 6128, 2006, pp. 612815-1 thru 612815-8.

D. T. Neilson et al, "Direct Laser Modulation", Filed on Jan. 31, 2011, U.S. Appl. No. 13/018,109.

Flavio Pardo, "Optical Transmitter With Flip-Chip Mounted Laser or Integrated Arrayed Waveguide Grating Wavelength Division Multiplexer", Filed on Nov. 12, 2010, U.S. Appl. No. 12/944,917.

Mark P. Earnshaw, "Opto-Electronic Assembly for a Line Card", Filed on Nov. 12, 2010, U.S. Appl. No. 12/944,875.

D. T. Neilson et al, "Optical Assembly for a WDM Receiver or Transmitter", Filed on Nov. 12, 2010, U.S. Appl. No. 12/944,939.

D. Gill, "Wavelength Aligning Multi-Channel Optical Transmitters", Filed on Nov. 12, 2010, U.S. Appl. No. 12/945,550.

\* cited by examiner

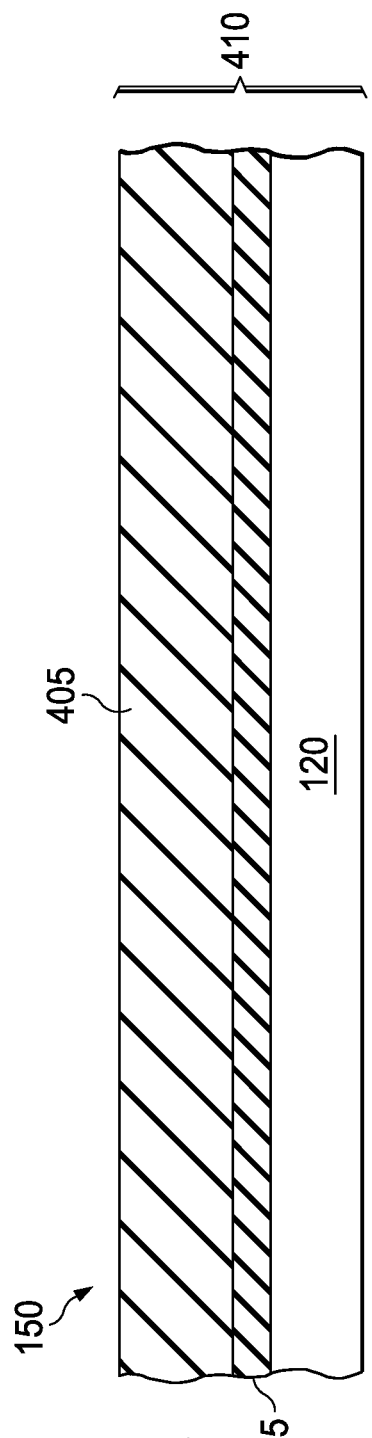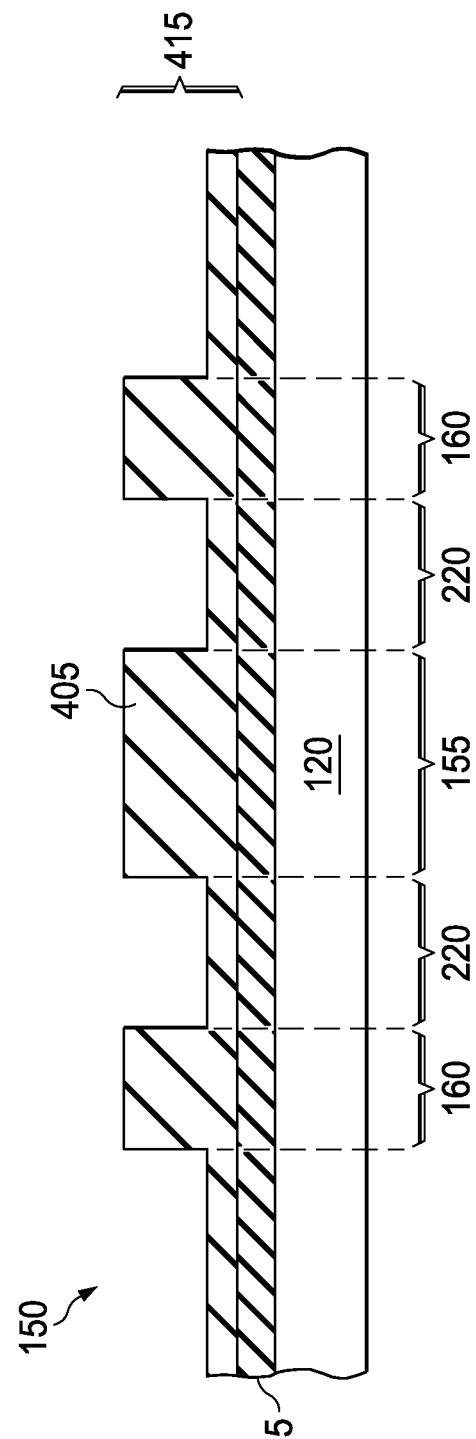

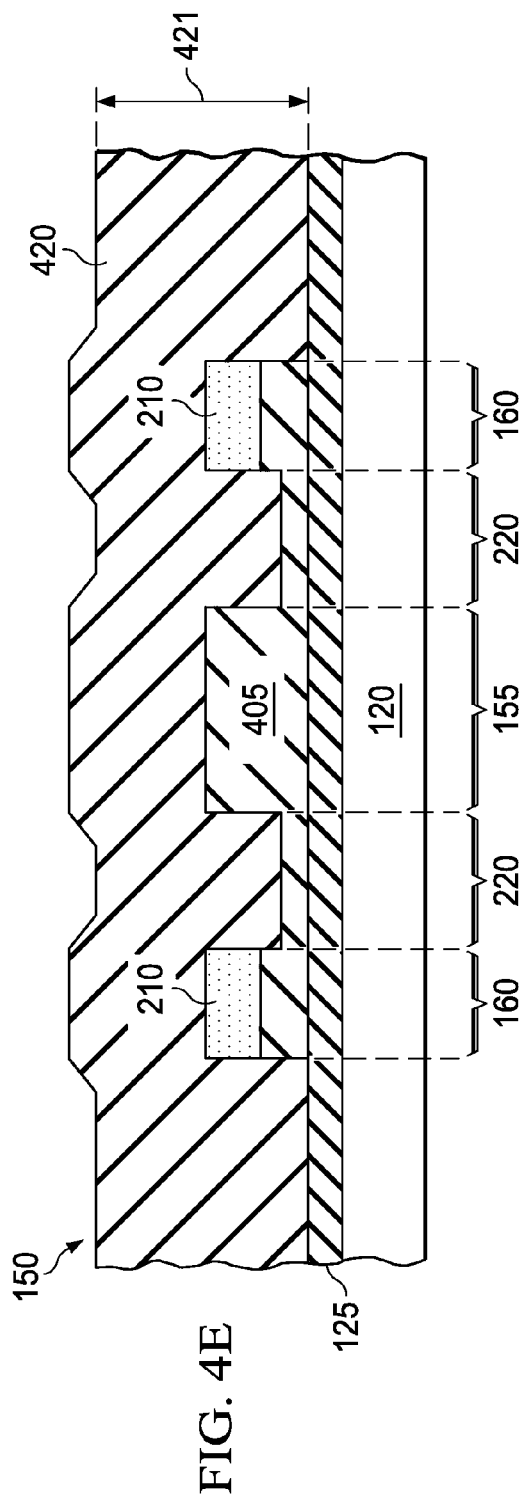
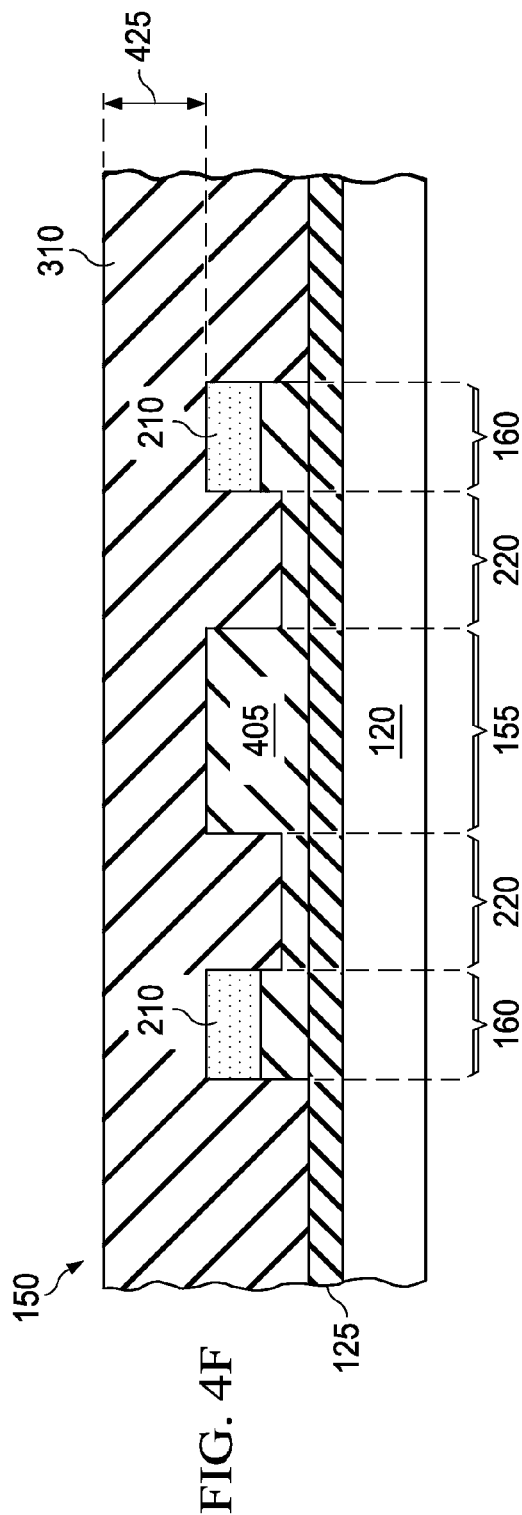
FIG. 4E
FIG. 4F

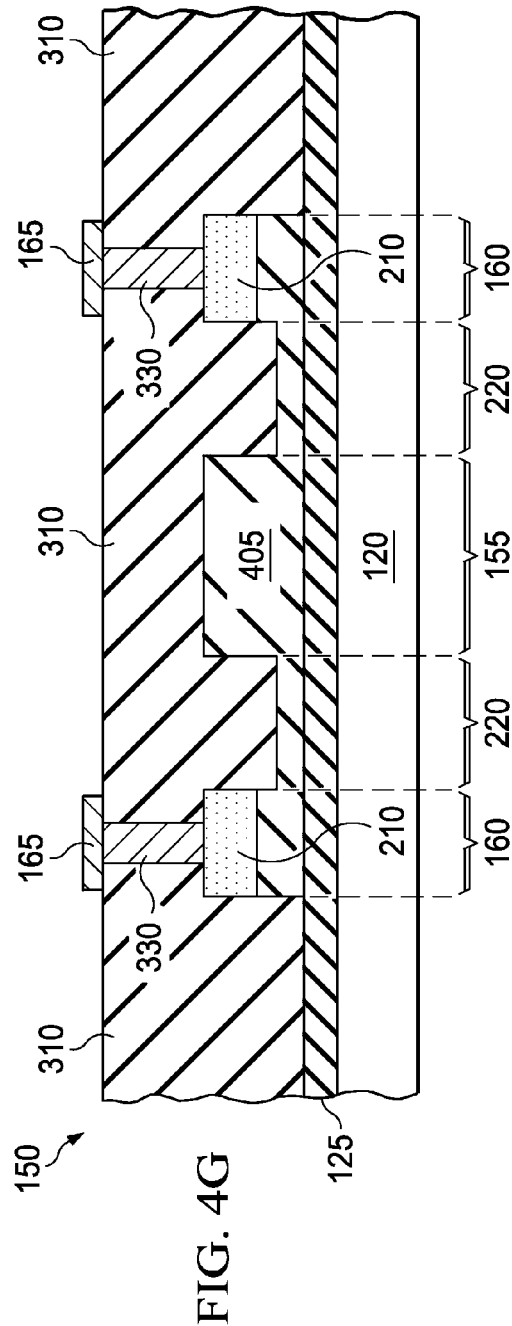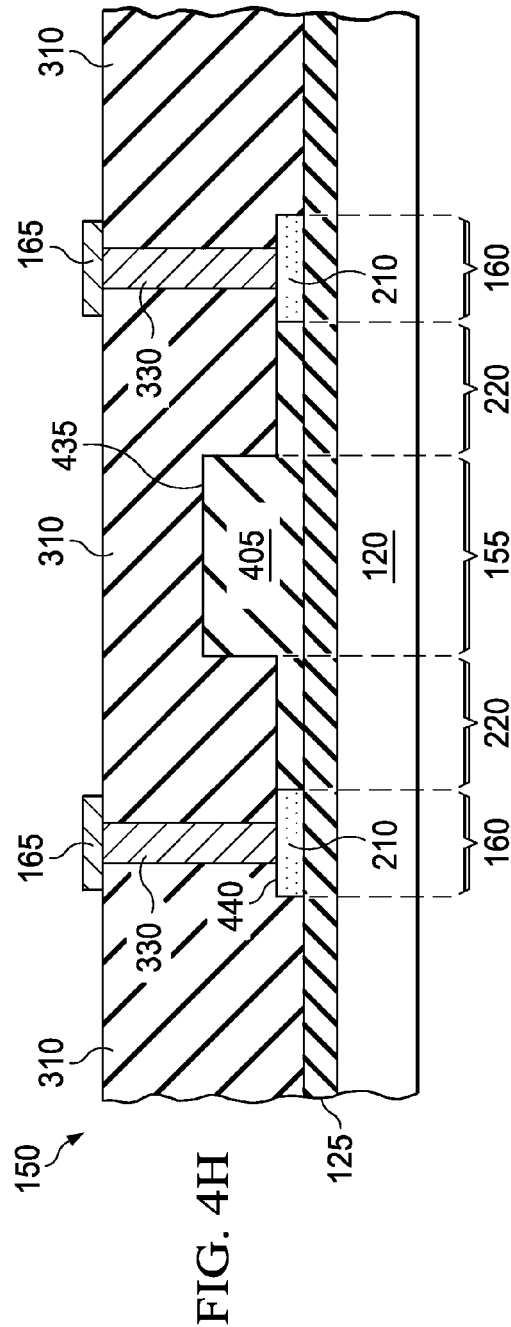

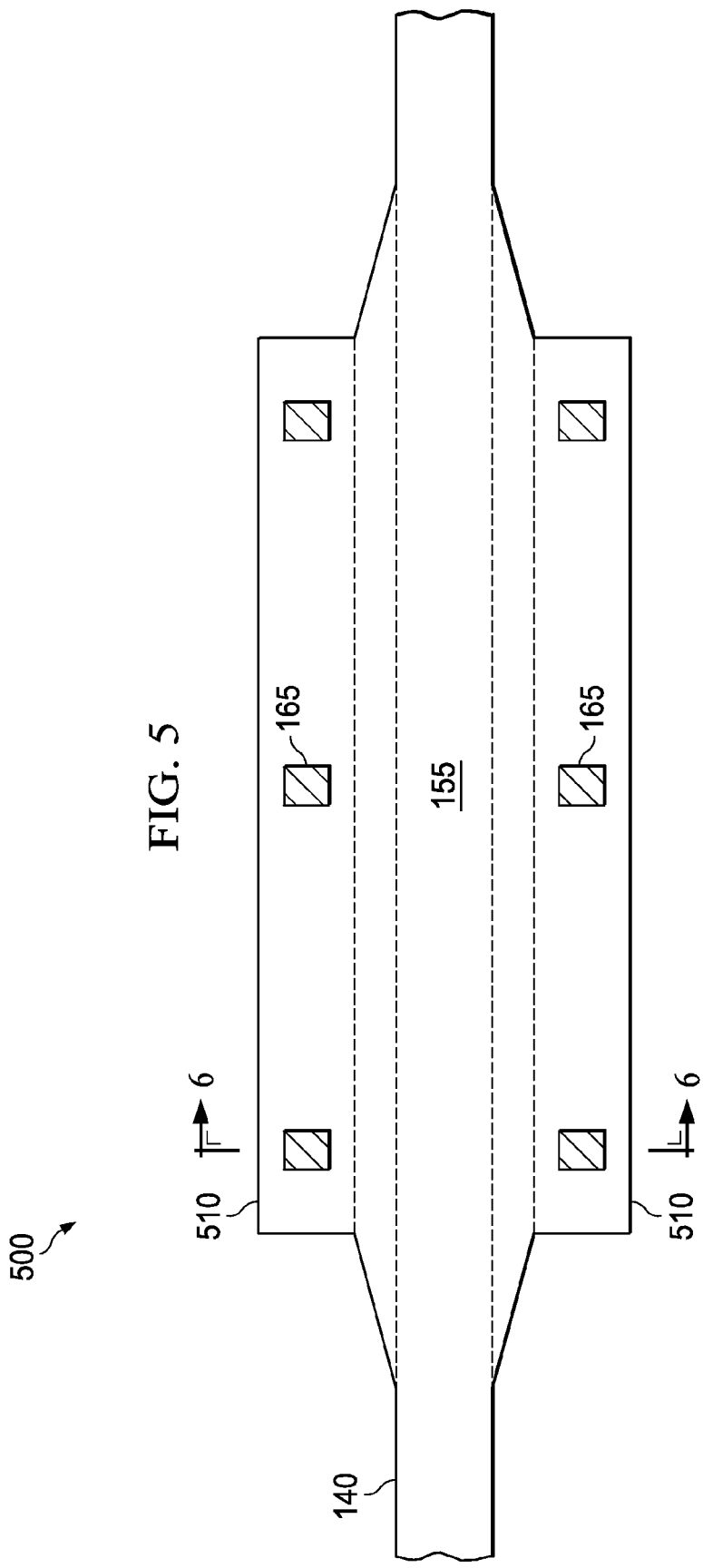

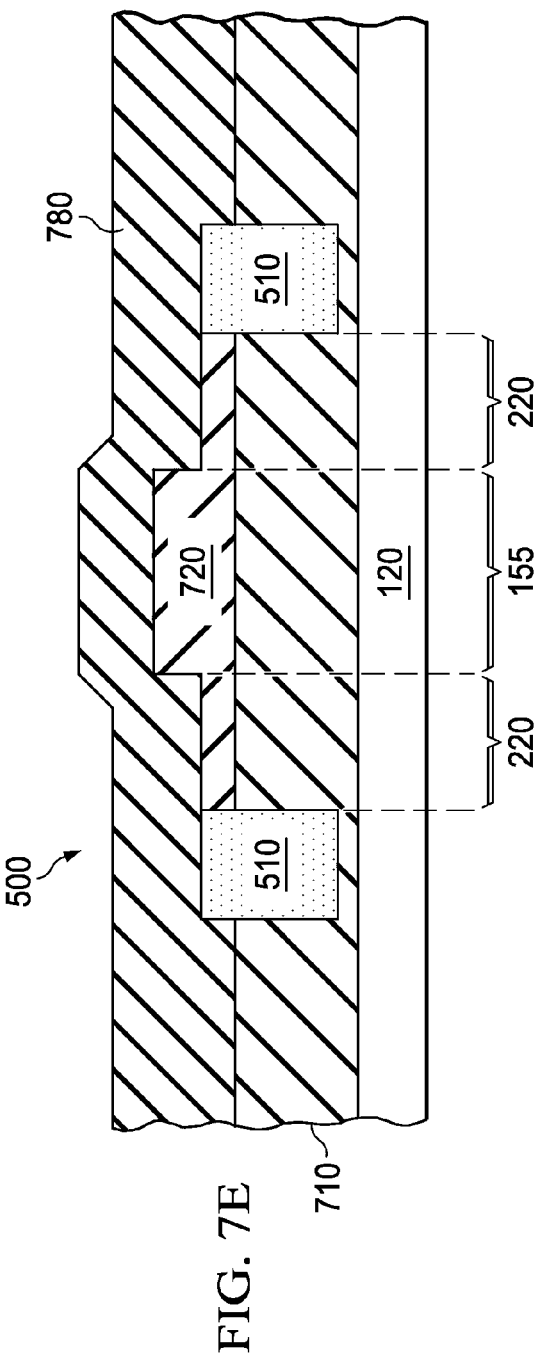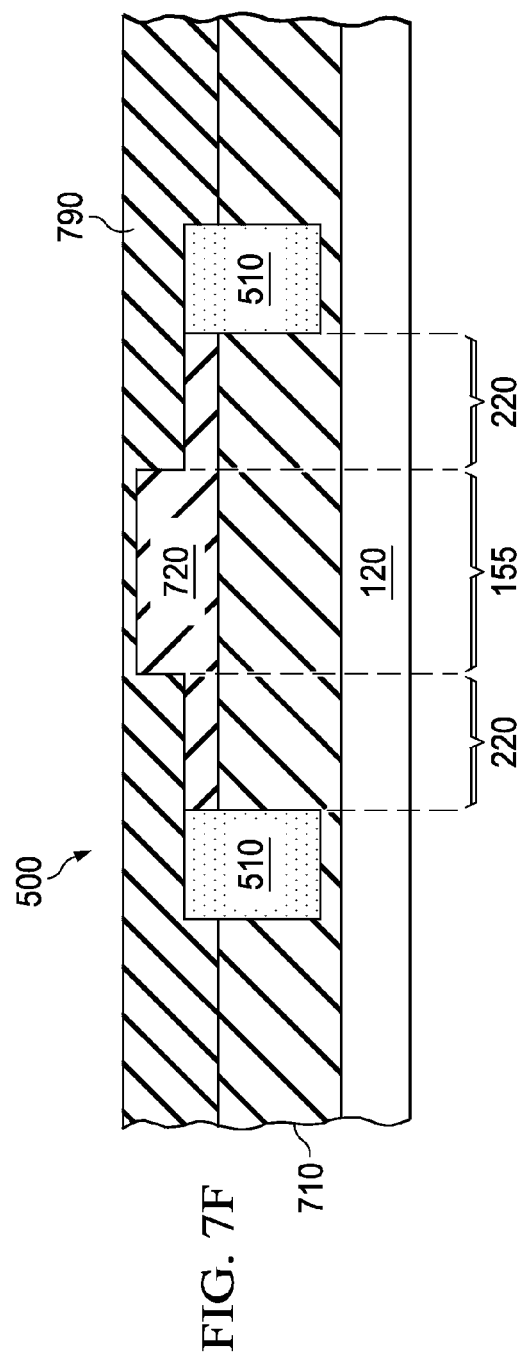

THERMALLY CONTROLLED SEMICONDUCTOR OPTICAL WAVEGUIDE

This application claims the benefit of U.S. provisional applications 61/390,876; 61/390,837; 61/390,840; and 61/390,798, which were all filed on Oct. 7, 2010.

TECHNICAL FIELD

This application is directed, in general, to a thermally controlled optical device and methods of making and using such devices.

BACKGROUND

Various optical devices rely on interference generated between two optical signals propagating in two optical paths when the optical paths and signals are combined. In some cases the optical path length of one or both of the optical paths may be varied to change the degree of interference between the optical signals. In this way, among other effects, the intensity of the combined signal may be varied.

SUMMARY

One aspect provides an apparatus. The apparatus includes a conductive or semiconductive substrate and a dielectric layer located directly thereon. A semiconductor layer is located directly on the dielectric layer. The semiconductor layer includes a ridge waveguide and a heater strip extending parallel to the ridge waveguide. The heater strip is electrically isolated from the ridge waveguide and is doped to carry a current therein about parallel to the ridge waveguide.

Another aspect provides a method. The method includes providing a conductive or semiconductive substrate having semiconductor layer located thereover and a dielectric layer located therebetween. A ridge waveguide and a heater strip are formed from the semiconductor layer. The heater strip is electrically isolated from and extends about parallel to the ridge waveguide. The semiconductor layer is doped such that the heater strip is configured to carry a current therein about parallel to the ridge waveguide.

BRIEF DESCRIPTION

Figure 2:
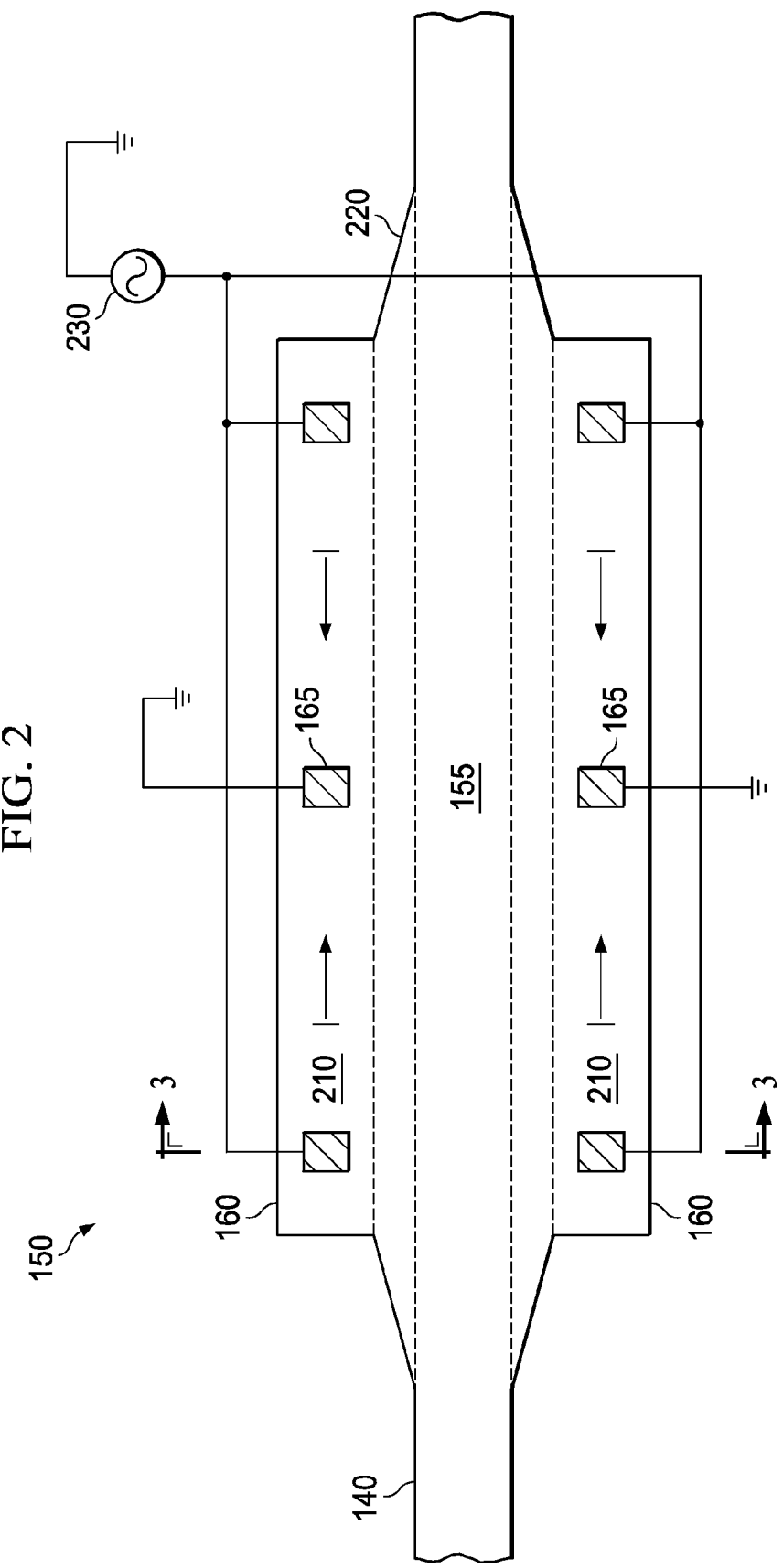
Figure 3:
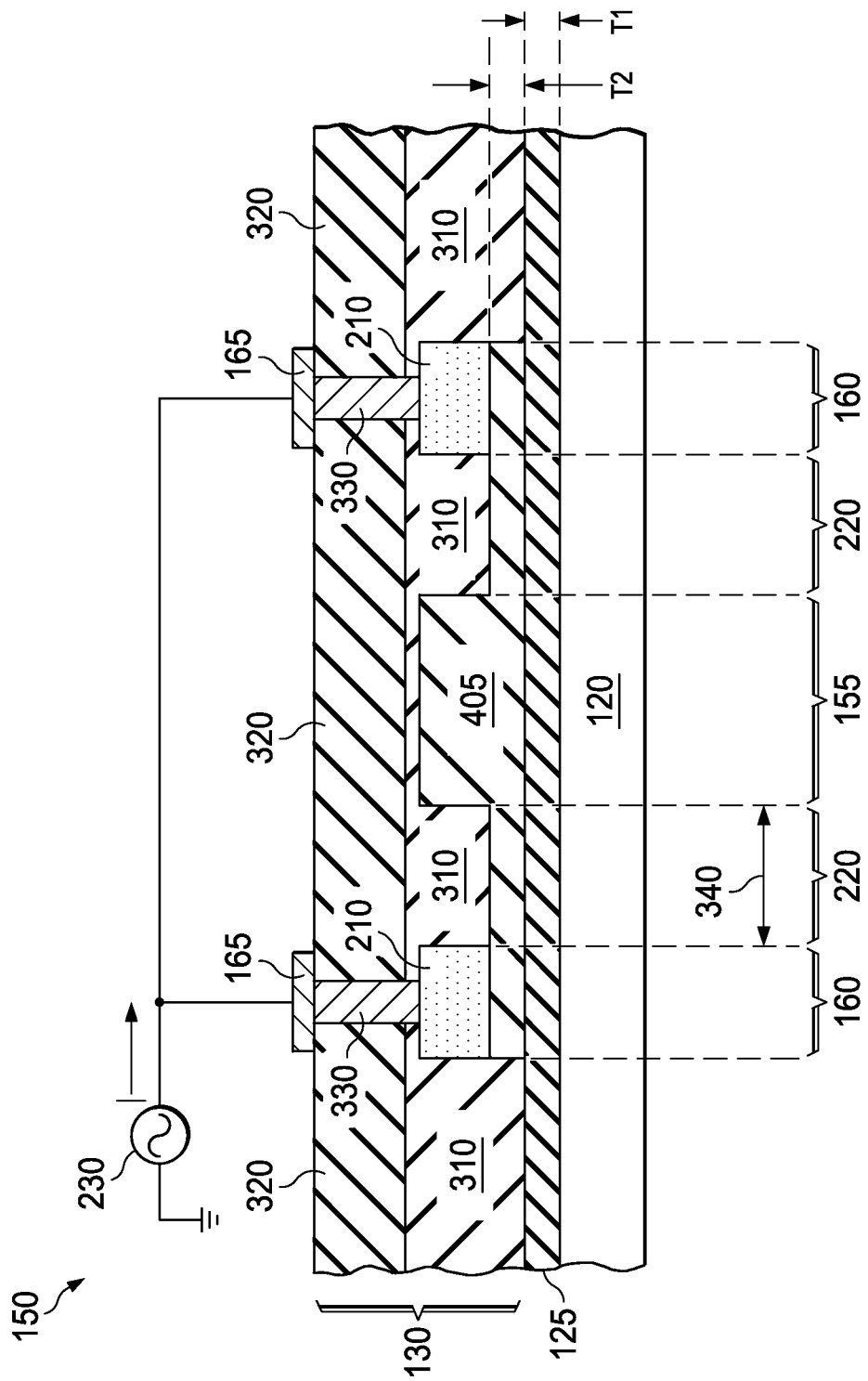
Figure 6:
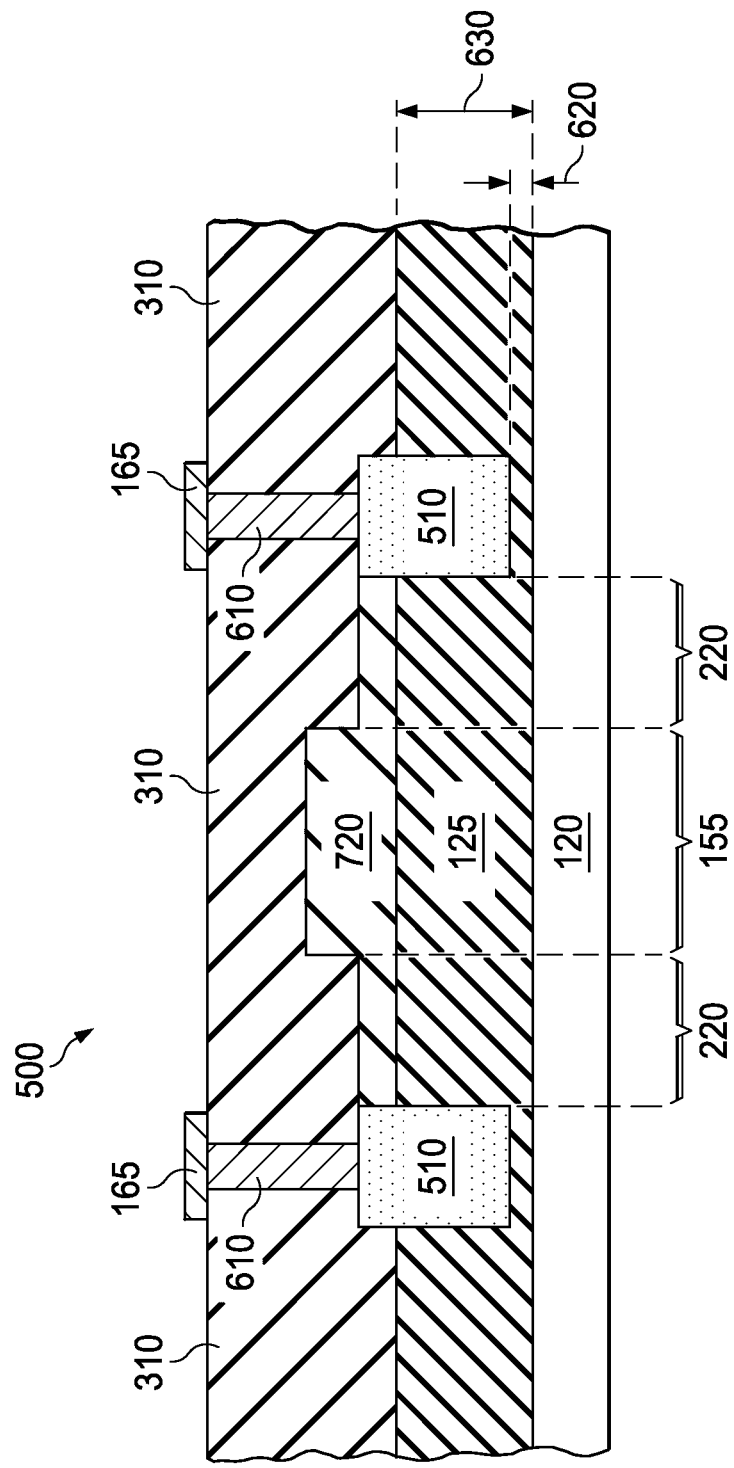
Figure 7A:
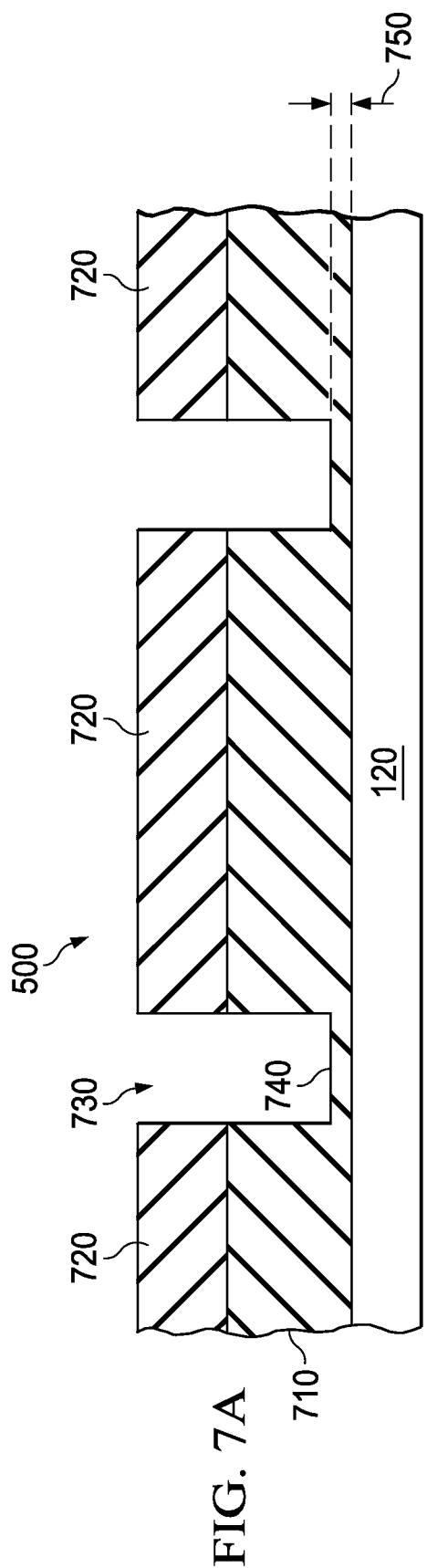
Figure 7B:
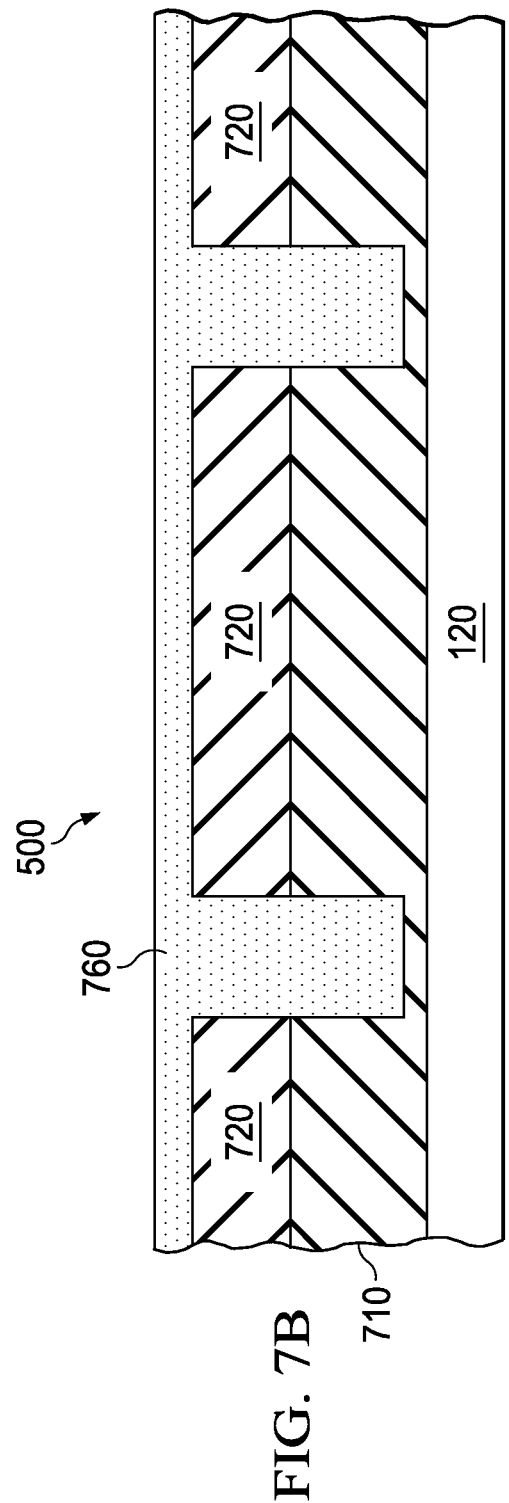
Figure 7C:
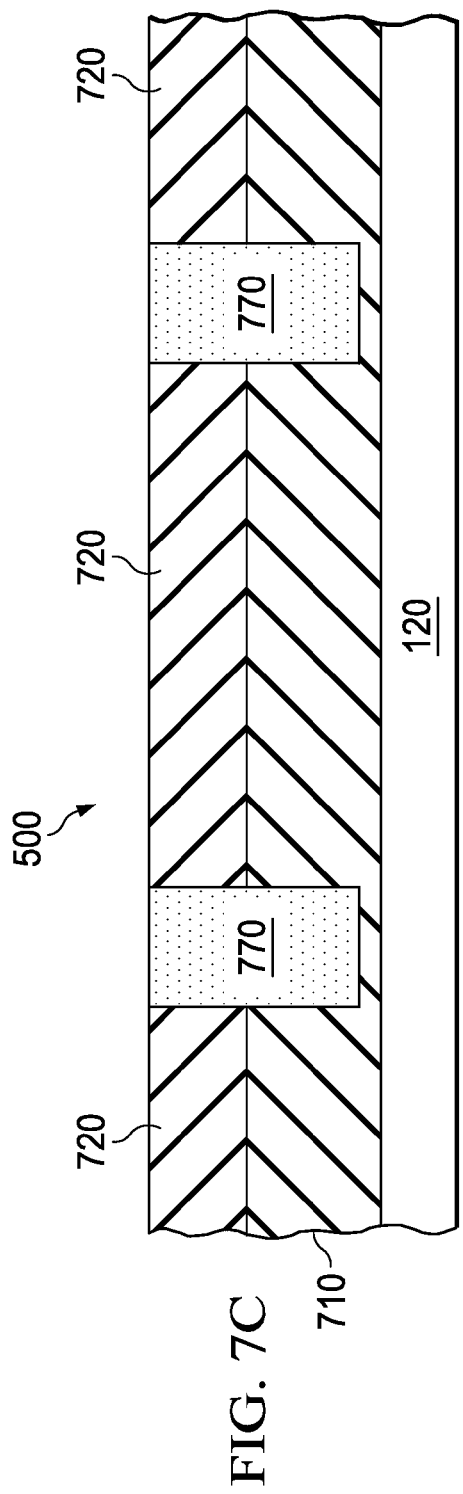
Figure 7D:
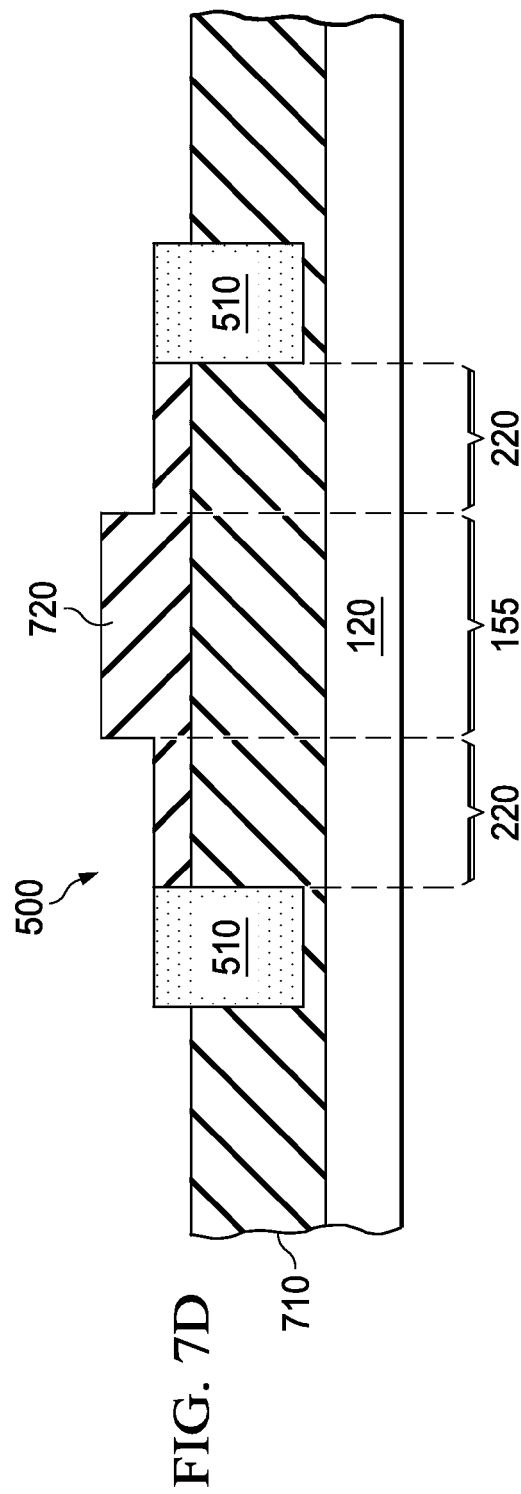
Figure 8:
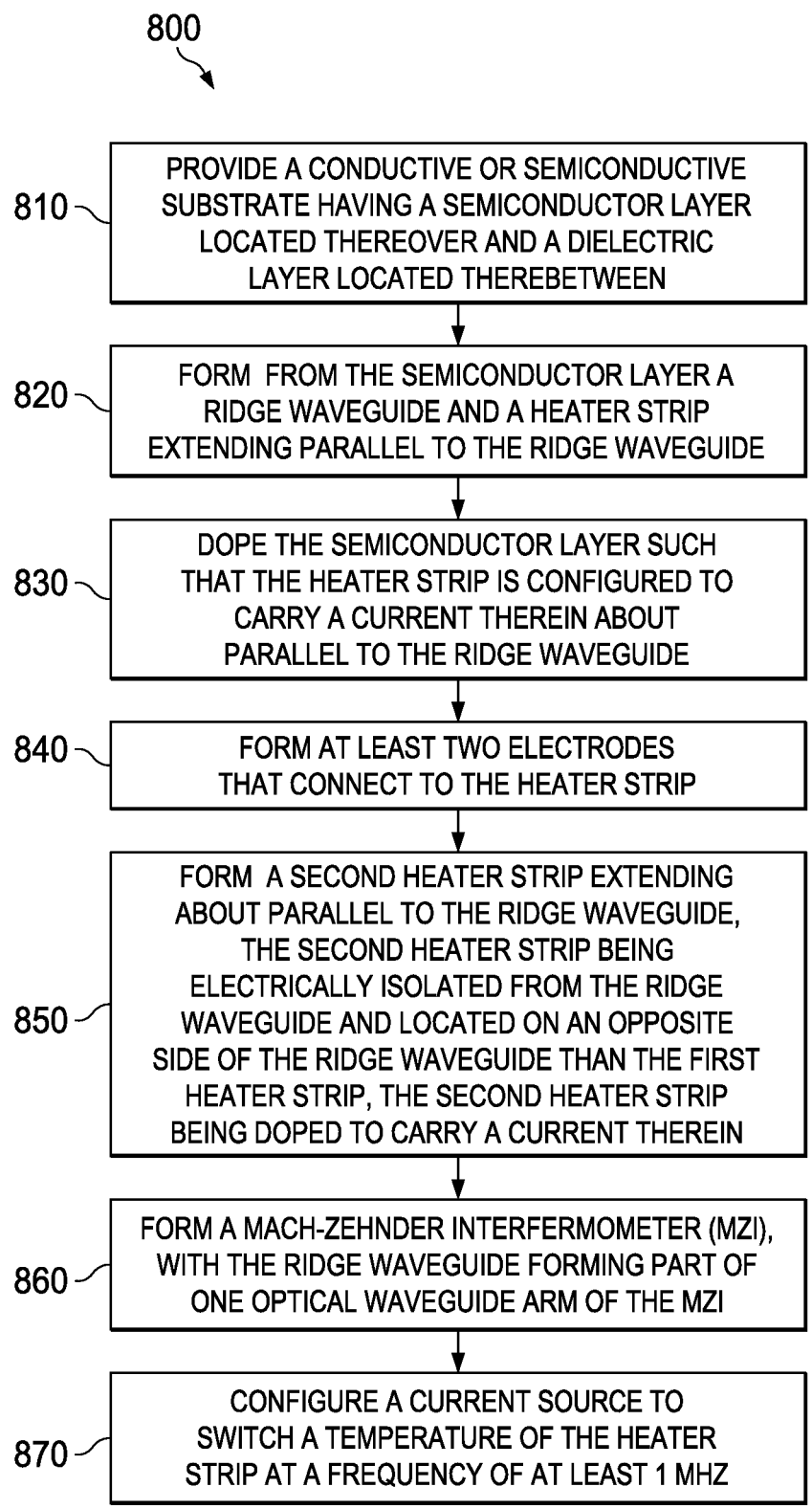

Reference is now made to the following descriptions taken in conjunction with the accompanying drawings, in which:

FIG. 1 illustrates an optical device, e.g. a variable optical attenuator (VOA), including a Mach-Zehnder interferometer (MZI), that includes a ridge waveguide and an adjacent heater strip;

FIGS. 2 and 3 respectively illustrate plan and sectional views of a portion of the MZI of FIG. 1, including heater strips configured to change the optical phase (e.g. the optical path length) of a portion of the VOA;

FIGS. 4A-4H present steps in an illustrative method of forming an apparatus of the disclosure, e.g. the embodiment of FIGS. 2 and 3;

FIGS. 5 and 6 respectively illustrate plan and sectional views of an embodiment in which a heater strip includes a portion with a lower surface that is closer to an underlying substrate than is a lower surface of the ridge waveguide;

FIG. 7A-7F present steps in an illustrative method of forming the embodiment of FIGS. 5 and 6; and FIG. 8 illustrates a method of the disclosure for forming an apparatus such as the VOA of FIG. 1.

DETAILED DESCRIPTION

U.S. provisional applications 61/390,876; 61/390,837; 61/390,840; and 61/390,798, which were all filed on Oct. 7, 2010; U.S. application "FIBER-OPTIC ASSEMBLY FOR A WDM TRANSCEIVER", which is being filed on Nov. 12, 2010, by David T. Neilson, Nagesh R. Basavanhally, and Mark Earnshaw Ser. No. 12/944,939; U.S. application "OPTO-ELECTRONIC ASSEMBLY FOR A LINE CARD", which is being filed on Nov. 12, 2010, by Mark Earnshaw Ser.No. 12/944,875; U.S. application "OPTICAL TRANSMITTER WITH FLIP-CHIP MOUNTED LASER OR INTEGRATED ARRAYED WAVEGUIDE GRATING WAVELENGTH DIVISION MULTIPLEXER", which is being filed on Nov. 12, 2010, by Mark Earnshaw and Flavio Pardo Ser. No. 12/944,917; U.S. application "THERMALLY CONTROLLED SEMICONDUCTOR OPTICAL WAVEGUIDE", which is being filed on Nov. 12, 2010, by Mahmoud Rasras Ser. No. 12/944,946; U.S. application "DIRECT LASER MODULATION", which is being filed on Nov. 12, 2010, by David T. Nielson and Pietro Bernasconi Ser. No. 12/945,429; and U.S. application "WAVELENGTH ALIGNING MULTI-CHANNEL OPTICAL TRANSMITTERS", which is being filed on Nov. 12, 2010, by Douglas M. Gill Ser. No. 12/945,550, are all incorporated herein by reference in their entirety. One or more of the above applications may describe optical transmitter structures and/or optical receiver structures; methods of making optical receiver structures and/or optical transmitter structures; and/or methods of using optical receivers, optical transmitters, and components thereof that may be suitable for use in or with, making of, and/or use of embodiments and/or components of embodiments as described herein.

Transparent optical communications systems sometimes use a variable optical attenuator (VOA). The VOA may be used in each wavelength channel to impose a dither tone at a frequency much below that of the data channel. The dither tone can be used to identify channels and their power levels in a multiplexed transmission signal. Some systems include over 50 data channels, and therefore optically multiplex many or even as many wavelengths. Therefore it is often desirable that the VOA be fast, e.g. a response time ≤1 μs, physically small and low cost for use in such systems.

The inventor discloses herein an innovative approach to optical system design that provides some embodiments that achieve a response time of a thermo-optic path that provides rapid intensity variation of an optical signal, e.g. 4 MHz, for optical systems using integrated optical devices. For example, those embodiments can enable high-frequency thermo-optic phase tuning of an optical path. Such fast phase tuning can be achieved in various embodiments in part by the use of standard integrated circuit fabrication processes. Therein, compact heating elements may be provided that consume only a small area of the integrated optical device and efficiently heat the optical path.

FIG. 1 illustrates an embodiment of an optical device 100. The device 100 is illustrated without limitation as a VOA employing a Mach-Zehnder interferometer (MZI) 105 having an input signal 110 and an output signal 115. The device 100 includes a substrate 120 and a dielectric layer 125 located thereon. The substrate 120 may be a conductive or semiconductive material such as a semiconductor wafer or a metal layer. Thus the substrate 120 is thermally conductive. When the substrate 120 is a semiconductor, it may be doped or intrinsic. In some cases the substrate 120 is a semiconductor wafer. Such wafers are conveniently compatible with semiconductor process steps that may be used to form the device 100, as discussed further below.

The dielectric layer 125 may include one or more material layers, e.g. silicon oxide or silicon nitride. A cladding layer 130 overlies the dielectric layer 125. The cladding layer 130 may also include one or more dielectric layers such as, e.g., silicon oxide or silicon nitride. The dielectric layer 125 and the cladding layer 130 may be formed from the same or different materials. The layers 125, 130 may include carbon or fluorine doped silicates when a lower refractive index of these layers is desired. Optionally the cladding layer 130 may be omitted, in which case the cladding may be, e.g. air. In some embodiments the substrate 120 and the dielectric layer 125 are conveniently provided as a silicon on insulator (SOI) wafer.

An optical ridge waveguide 135 is located on the dielectric layer 125 and within the cladding layer 130. The ridge waveguide 135 is formed of a semiconducting material, e.g. Si, Ge, GaAs, CdTe, GaP, InP, or InAs. The width of the ridge waveguide 135 is not limited to any particular value. However, when the refractive index contrast between the ridge waveguide 135 and the cladding layer 130 is high, e.g. the ridge waveguide 135 refractive index is at least 2 times the cladding layer 130 refractive index, the width of the ridge waveguide 135 may be significantly smaller than the wavelength of the optical signal propagating therein. Thus, for example, the ridge waveguide 135 may have a width less than 1 µm, e.g. about 550 nm when $\lambda=1.55$ µm.

The optical device 100 includes waveguide arms 140, 145. One or both of the waveguide arms 140, 145 may include an optical phase tuner 150. The optical phase tuner 150 includes a semiconductor optical ridge waveguide section 155 and one or more semiconductor heater strips 160 oriented about parallel to the semiconductor optical ridge waveguide section 155. The semiconductor optical ridge waveguide section 155 is the lateral guiding portion of the optical ridge waveguide 135. The semiconductor heater strips 160 are located along and near the semiconductor optical ridge waveguide section 155 to provide heat thereto. The heating changes the refractive index of the semiconductor optical ridge optical waveguide section 155. The heating can change the optical path length difference between the optical waveguide arms 140, 145 thereby inducing a relative phase shift between signal portions 110', 110" therethrough. Interference between the signal portions 110', 110" emitted by the optical waveguide arms 140, 145 may reduce the intensity of the output signal 115 relative to the intensity of the input signal 110. The amount of attenuation may be varied by varying current in the semiconductor heater strips 160, which can change the relative phase shift between the two waveguide arms 140, 145. The current may be provided by way of conventional metal pads 165 as described further below.

As described previously, appropriate manipulation of the temperature of the ridge waveguide 135 in one or both waveguide arms 140, 145 of the MZI 105 (FIG. 1), controls the relative phase shift of the signal portions of 110', 110". In the illustrated embodiment the device 100 includes two such optical phase tuners 150. An alternate embodiment uses a single optical phase tuner 150 to change the optical path length of one of the waveguide arms 140, 145 relative to the other.

Optical intensity detectors 170, e.g. conventional semiconductor diodes, e.g., Ge PIN diodes, with a waveguide tap, may optionally be used to detect the intensity of the signals 110, 115. The detected intensity may be used as a feedback signal to a controller (not shown) to adjust a drive current to the semiconductor heater strips 160 to result in a desired change of relative intensity of the output signal 115.

FIGS. 2 and 3 respectively illustrate plan and sectional views of one instance of the optical phase tuner 150, including a portion of the semiconductor optical ridge waveguide section 155. In the following discussion concurrent reference is made to FIGS. 2 and 3. The semiconductor heater strip 160 includes two doped semiconductor regions 210 that may optionally be heavily doped. The metal pads 165 electrically contact the doped semiconductor regions 210 through the cladding layer 130 by way of vias 330 (FIG. 3). The semiconductor optical ridge waveguide section 155 is located between the doped semiconductor regions 210. The semiconductor heater strip 160, the ridge waveguide 135 and the semiconductor optical ridge waveguide section 155 may be contiguous portions of a single semiconductor layer. By contiguous, it is meant that the semiconductor heater strip(s) 160, the ridge waveguide 135 and the semiconductor optical ridge waveguide section 155 are formed from portions of a single precursory semiconductor layer without forming a gap between the portions. Thus, for example, the semiconductor heater strip 160, the ridge waveguide 135 and the semiconductor optical ridge waveguide section 155 may be portions of a mono-crystalline lattice, such as the top semiconductor layer of an SOI wafer. In some embodiments the precursory semiconductor layer is a polycrystalline layer, in which case one or more grain boundaries may be present within or between the portions, but the portions are still contiguous. Semiconductor bridges 220 electrically and thermally isolate the doped semiconductor regions 210 to the semiconductor optical ridge waveguide section 155. Optionally, as illustrated, the semiconductor bridges 220 may fill the corner between the semiconductor optical ridge waveguide section 155 and the doped semiconductor regions 210.

As described previously, current may be caused to flow through the semiconductor heater strip 160, i.e., parallel to the semiconductor optical ridge waveguide section 155, thereby causing the temperature of the semiconductor optical ridge waveguide section 155 to increase. When the current is removed, the semiconductor optical ridge waveguide section 155 cools as its heat diffuses, e.g. to the thermally conductive substrate 120.

FIG. 3 illustrates a sectional view of one instance of the optical phase tuner 150 at the location marked in FIG. 2. The dielectric layer 125 is located between the substrate 120 and the semiconductor optical ridge waveguide section 155. As described previously the substrate 120 and the dielectric layer 125 may be provided as an SOI substrate. In such cases, the dielectric layer 125 is present on the substrate 120 as received from a wafer manufacturer. An SOI substrate typically also includes a mono-crystalline semiconductor layer located on the dielectric layer 125. The ridge waveguide 135, the semiconductor optical ridge waveguide section 155 and the semiconductor heater strips 160 may be formed from this mono-crystalline semiconductor layer. This aspect is described further below.

The dielectric layer 125 has a thickness $T_1$ that is not limited to any particular value. In some embodiments, $T_1$ is about 1 µm. In this context, "about" means ±10%. It is believed that this distance provides beneficial operating conditions for the device 100. As described previously, heat from the semiconductor heater strips 160 is at least partially diffused to the substrate 120. This heat is expected to diffuse more rapidly when $T_1$ is relatively thinner. On the other hand, capacitive coupling between the semiconductor heater strips 160 and the substrate 120 is lower when $T_1$ is relatively thicker. Capacitive coupling is expected to reduce, due to charging effects, the maximum rate at which the semiconductor heater strips 160 may be operated to effect a time-varying phase on the input signal 110. Thus, it is believed that these competing aspects are desirably balanced when $T_1$ is about 1 μm, at least for embodiments in which the dielectric layer 125 is formed from silicon oxide. However, the device 100 may be formed and operated with a value of $T_1$ other than 1 μm and the dielectric layer 125 being a material other than is silicon oxide. For example, if the dielectric layer 125 is silicon nitride, the desired balance between thermal conduction and capacitance may occur for a different thickness of the dielectric layer 125 due to the higher dielectric constant of silicon nitride versus silicon oxide.

In the embodiment of FIG. 3 the cladding layer 130 includes two discrete layers. A first cladding layer 310 is located such that it is in direct contact with the semiconductor optical ridge waveguide section 155 and ridge waveguide 135. A second cladding layer 320 overlies the first cladding layer 310. Both of the cladding layers 310, 320 may be formed from a conventional dielectric material such as plasma-deposited silicon oxide. Vias 330 provide a conductive path between the metal pads 165 and the doped semiconductor regions 210. This embodiment is illustrative of cases in which the ridge waveguide 135 is a part of a multi-level integrated device. In other embodiments the cladding layer 310 may be omitted, e.g. in a single-level device.

Referring to FIG. 2, a voltage potential, e.g. from an RF signal source 230, is placed across the metal pads 165 such that a current I flows about parallel to the semiconductor optical ridge waveguide section 155. The doped semiconductor regions 210 are thereby heated, and the heat diffuses to the semiconductor optical ridge waveguide section 155 to effect the desired change of optical path length. In one embodiment the RF signal source 230 is operated in a push-pull configuration. This configuration is expected to require lower drive power of the semiconductor heater strips 160 than alternative methods of driving.

The optical phase tuner 150 advantageously provides the ability to rapidly modulate the phase of the signal portions 110', 110". Several aspects contribute to this capability. First, the thickness of the semiconductor heater strips 160 may be no greater than the thickness of the layer from which the ridge waveguide 135 and the semiconductor optical ridge waveguide section 155 are formed. Also, the width of the semiconductor heater strips 160 need not be larger than needed to accommodate the vias 330. Thus, the thermal mass of the semiconductor heater strips 160 may be very small. Second, the substrate 120 provides a large sink for heat produced by the semiconductor heater strips 160. Third, the semiconductor heater strips 160 may be very close to the semiconductor optical ridge waveguide section 155. A gap 340 (FIG. 3) between the semiconductor optical ridge waveguide section 155 and the semiconductor heater strips 160 need only be wide enough to effectively isolate the optical signal within the semiconductor optical ridge waveguide section 155 from the semiconductor heater strips 160, e.g. about 500 nm. This small gap is enabled in part by the high refractive index of the semiconductor optical ridge waveguide section 155. Thus the thermal path between the semiconductor heater strips 160 and the semiconductor optical ridge waveguide section 155 may be very short.

This combination of factors enables the temperature of the semiconductor optical ridge waveguide section 155 to be rapidly increased by the application of current to the metal pads 165, and to rapidly decrease when the current is removed. In various embodiments described herein, it is expected that the thermal switching frequency of the semiconductor optical ridge waveguide section 155 is at least 1 MHz. Thus, the switching frequency phase of the signal portions 110', 110" may also be at least 1 MHz. In contrast, several known conventional thermally tuned waveguides have a typical switching frequency of only a few kHz. Thus, the switching speed achieved in various embodiments described herein represents a significant advance in the optical arts.

The semiconductor heater strips 160 are electrically isolated from the semiconductor optical ridge waveguide section 155 by the semiconductor bridges 220. Because the semiconductor bridges 220 are not additionally doped, their resistivity is much greater than the resistivity of the doped semiconductor regions 210 and about the same as the optical ridge waveguide section 155. Moreover, the resistance of the semiconductor bridges 220 is increased by the reduced thickness thereof. However the semiconductor bridges 220 provide greater thermal conductivity between the semiconductor heater strips 160 and the optical ridge waveguide section 155 than would be provided by the cladding layer 310 only. Thus heat may be conducted from the heater strips 160 and the optical ridge waveguide section 155 while limiting charge carriers within the optical ridge waveguide section 155 that might otherwise increase optical loss therein.

Turning now to FIGS. 4A through 4H, illustrated are cross sections of the optical phase tuner 150 at various stages of manufacturing at the section illustrated in FIG. 3. These figures provide a broad outline of a process that may be adapted by those skilled in the pertinent arts to any of a number of semiconductor process tools and manufacturing facilities. All such variations that do not require undue experimentation are explicitly regarded as within the scope of the disclosure and the claims. Moreover, it will be apparent to skilled artisans that various conventional manufacturing aspects may be practiced in addition to the steps shown to form the device 100.

FIG. 4A illustrates the optical phase tuner 150 at an early stage of manufacturing. A semiconductor layer 405 overlies the substrate 120, and the dielectric layer 125 is located therebetween. The dielectric layer 125 may have a thickness of about 1 μm, though the thickness is not limited thereto. The semiconductor layer 405 may be about 220 nm, but the thickness is not limited thereto. The substrate 120, dielectric layer 125 and the semiconductor layer 405 may each be one of several materials as described previously. For brevity of description, and without limitation to a particular combination of materials, the substrate 120 is taken to be a silicon wafer, the dielectric layer 125 is taken to be silicon oxide, and the semiconductor layer 405 is taken to be a mono-crystalline silicon layer. The substrate 120, dielectric layer 125 and semiconductor layer 405 may optionally be provided as an SOI wafer 410.

FIG. 4B illustrates the optical phase tuner 150 after a first patterning step that may include conventional patterning of a photoresist layer and plasma etch of the semiconductor layer 405. The patterning process may include the use of a first mask that defines the extent of the portions of the semiconductor layer 405 to be partially removed. The patterning results in a partially patterned silicon layer 415.

Figure 4C:
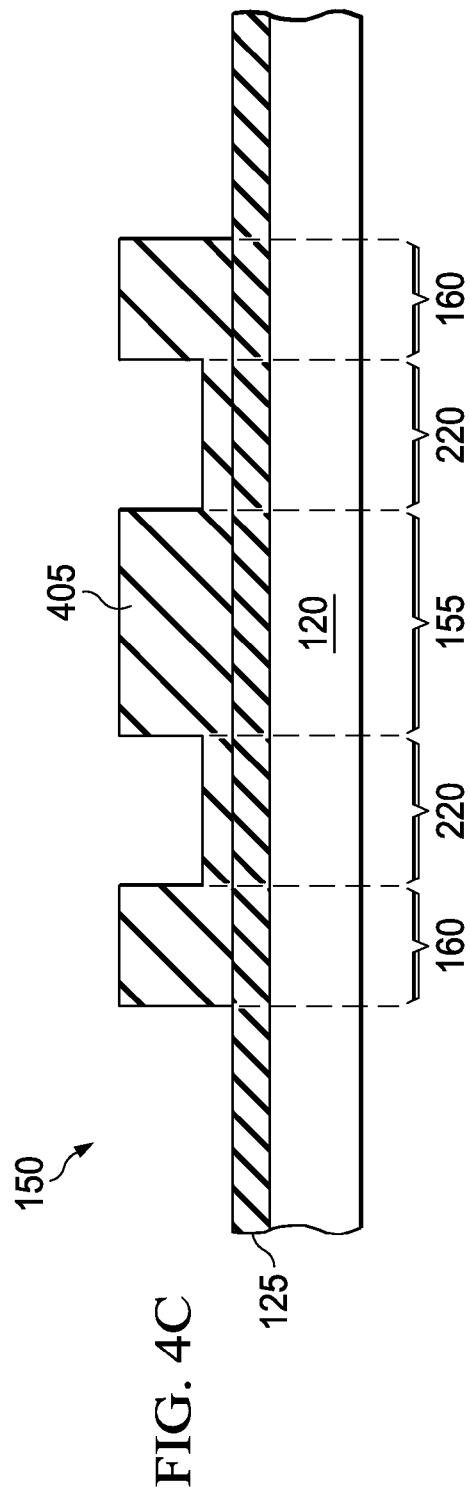

FIG. 4C illustrates the optical phase tuner 150 after a second patterning step to further define features in the partially patterned silicon layer 415. The patterning process may include use of a second mask that defines the extent of the portions of the semiconductor layer 405 to be fully removed. Thus, in areas in which the semiconductor layer 405 is fully removed the dielectric layer 125 is exposed by the etch process. The patterning results in formation of the semiconductor optical ridge waveguide section 155 and the semiconductor heater strips 160. The semiconductor optical ridge waveguide section 155 and the semiconductor heater strips 160 are contiguous portions of the semiconductor layer 405.

Figure 4D:
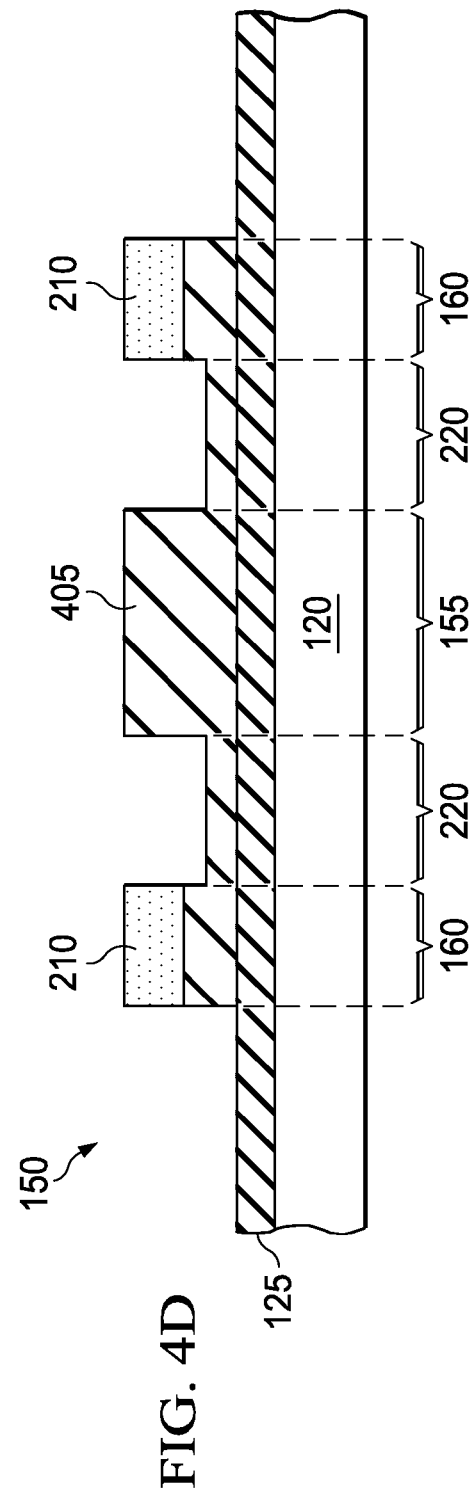

FIG. 4D illustrates the optical phase tuner 150 after an implant step that may be used to form the doped semiconductor regions 210. The doped semiconductor regions 210 may be n-doped or p-doped as desired, with the doping level selected to result in a desired resistance of the semiconductor heater strips 160. The portions of the device 100 to be implanted may be defined by openings in a photoresist layer that protects other portions of the device 100 from the implant process.

In various embodiments the semiconductor layer 405 is intrinsic, e.g. undoped. Intrinsic silicon, for example, has a resistivity of about 2.3E5 ohm-cm, while a typical doped SOI wafer (doping concentration ≈1E15) has a resistivity of about 14-22 ohm-cm. The doped semiconductor regions 210 are implanted with a dopant concentration preferably at least about $1E15$ cm$^{-3}$ to provide adequate current flow to produce sufficient heat. In some embodiments the dopant concentration is more preferably at least about $1E17$ cm$^{-3}$, and in some embodiments most preferably at least about $1E19$ cm$^{-3}$. Thus, the conductivity of the doped semiconductor regions 210 may be at least about 1E4 times greater than the conductivity of the semiconductor optical ridge waveguide section 155.

FIG. 4E illustrates the optical phase tuner 150 after a deposition step in which a cladding layer 420 such as plasma-deposited silicon oxide is formed over the ridge waveguide 135 and the semiconductor optical ridge waveguide section 155. The cladding layer 420 may be deposited with a thickness 421 that is greater than the thickness of the semiconductor optical ridge waveguide section 155 to allow for a later optional planarization step.

FIG. 4F illustrates the optical phase tuner 150 after an optional planarization process has removed a portion of the cladding layer 420. The planarization process may be, e.g. a chemical-mechanical polishing (CMP) process, the details of which are determinable by one skilled in the pertinent art. In various embodiments the planarization process forms the first cladding layer 310 and leaves a remaining portion 425 of the first cladding layer 310 over the ridge waveguide 135 and the doped semiconductor regions 210. The remaining portion 425 may serve to isolate waveguides in an optional second waveguide level from the ridge waveguide 135. In various embodiments the remaining portion 425 has a thickness of at least about 100 nm.

FIG. 4G illustrates the optical phase tuner 150 after the vias 330 and metal pads 165 are formed using conventional patterning and metallization steps. The metal pads 165 may be connected to a current source by conventional means such as wire bonding.

FIG. 4H illustrates an alternate embodiment of the optical phase tuner 150, in which a top surface 435 of the semiconductor optical ridge waveguide section 155 and a top surface 440 of the semiconductor heater strip 160 are non-coplanar. Such a configuration may be desirable to achieve specific characteristics of the resistance and/or thermal mass of the semiconductor heater strip 160. The illustrated profile of the semiconductor heater strip 160 may be easily formed by modifying the first patterning step described with respect to FIG. 4B.

FIGS. 5 and 6 illustrate an alternate embodiment of an optical phase tuner 500, with FIG. 5 presenting a plan view, and FIG. 6 presenting a sectional view. The optical phase tuner 500 includes semiconductor heater blocks 510 that are formed from a portion of a semiconductor that is different from the semiconductor optical ridge waveguide section 155. Thus, in contrast to the optical phase tuner 150 the semiconductor heater blocks 510 and the semiconductor optical ridge waveguide section 155 are not formed from contiguous portions of a same semiconductor layer. In some embodiments, the semiconductor heater blocks 510 are doped polysilicon, while the semiconductor optical ridge waveguide section 155 is intrinsic mono-crystalline silicon.

FIG. 6 illustrates vias 610 connecting the metal pads 165 and the semiconductor heater blocks 510. A distance 620 describes the proximity of the semiconductor heater blocks 510 to the substrate 120. Notably, the distance 620 may be significantly less than a distance 630 between the bottom of the semiconductor optical ridge waveguide section 155 and the substrate 120. During operation the semiconductor heater blocks 510 may be heated by current flowing therethrough. The semiconductor heater blocks 510 may thereby indirectly heat the semiconductor optical ridge waveguide section 155 by thermal conduction through the semiconductor bridges 220. When the current is removed, heat from the semiconductor optical ridge waveguide section 155 and the heater blocks 510 may diffuse rapidly to the substrate 120.

It is believed that the proximity of the semiconductor heater blocks 510 to the substrate 120 will allow the semiconductor optical ridge waveguide section 155 to cool more rapidly in the optical phase tuner 500 than in the optical phase tuner 150. However, the greater distance 630 provides greater isolation of the semiconductor optical ridge waveguide section 155 from the substrate 120, thereby reducing capacitive coupling therebetween. It is expected that this greater isolation may allow TM polarization modes to propagate in the optical phase tuner 500. In contrast, TM modes are not expected to propagate well in some embodiments of the optical phase tuner 150 due to the proximity (e.g. about 1 μm) of the semiconductor optical ridge waveguide section 155 to the substrate 120.

FIGS. 7A-7F illustrate steps of a method of forming the optical phase tuner 500. In FIG. 7A a dielectric layer 710 is located between the substrate 120 and a semiconductor layer 720. The dielectric layer 710 may be, e.g. silicon oxide, and the semiconductor layer 720 may be, e.g. silicon which may optionally be mono-crystalline. In some embodiments the substrate 120, dielectric layer 710 and semiconductor layer 720 may be conveniently provided by a conventional SOI wafer. Those skilled in the pertinent art are aware of other ways to provide the substrate 120, dielectric layer 710 and semiconductor layer 720.

The dielectric layer 710 is not limited to any particular thickness. However, the benefit of TM propagation is expected to be realized when the distance 630 (FIG. 6) is at least about 1 μm thick when formed of silicon oxide. Moreover, it may be difficult to form the semiconductor heater blocks 510 when the distance 630 is greater than 2-3 μm. Therefore, in some embodiments the distance 630 ranges from about 1 μm to about 2 μm.

In FIG. 7A trenches 730 have been conventionally formed within the dielectric layer 710 and the semiconductor layer 720, e.g. by a plasma etch process. The trenches 730 are optionally formed such that residual portions 740 with thickness 750 remain over the substrate 120. The residual portions 740 thermally and electrically insulate the semiconductor heater blocks 510 from the substrate 120. The process used to form the trenches 730 may be designed such that the thickness 750 is any value less than the distance 630, including about zero. Note that in the case that the thickness 750 is about zero the thermal conduction from the semiconductor heater blocks

510 should be greatest, but if the substrate 120 is significantly conductive then the semiconductor heater blocks 510 may be electrically shorted. In such cases it may therefore be desirable to use a highly resistive, e.g. intrinsic, semiconductor wafer as the substrate 120.

FIG. 7B illustrates the optical phase tuner 500 after forming a conductive semiconductor layer 760 over the substrate 120 and within the trenches 730. The conductive semiconductor layer 760 may be formed, e.g. from doped polysilicon. In various embodiments the conductivity of the conductive semiconductor layer 760 is greater than the conductivity of the semiconductor layer 720. The conductivity of the conductive semiconductor layer 760 may be at least 1E4 times greater than that of the semiconductor layer 720. For example, the semiconductor layer 720 may be intrinsic, while the conductive semiconductor layer 760 may be doped to have a carrier concentration of at least about 1E15 cm$^{-3}$. In some cases it may be preferable that the conductive semiconductor layer 760 have a carrier concentration of at least about 1E17 cm$^{-3}$, and more preferable to have a carrier concentration of at least about 1E19 cm$^{-3}$. In a more specific example, the semiconductor optical ridge waveguide section 155 may be formed from intrinsic silicon ($\sigma \approx$ 4E–6 S·cm$^{-1}$), and the conductive semiconductor layer 760 may be boron-doped with a dopant concentration of about 1E17 cm$^{-3}$ ($\sigma \approx$ 5 S·cm$^{-1}$).

FIG. 7C illustrates the optical phase tuner 500 after a planarization process that removes the conductive semiconductor layer 760 located over the semiconductor layer 720. A typical planarization process, such as CMP, will also remove a portion of the semiconductor layer 720. The removing electrically isolates the portions of the conductive semiconductor layer 760 within the trenches 730, thereby forming semiconductor portions 770.

In FIG. 7D a portion of the semiconductor layer 720 and the semiconductor portions 770 have been removed by a conventional pattern and etch process, thereby forming the semiconductor optical ridge waveguide section 155, the semiconductor bridges 220 and the semiconductor heater blocks 510.

FIG. 7E illustrates the optical phase tuner 500 after a dielectric layer 780, e.g. silicon oxide, has been formed over the semiconductor optical ridge waveguide section 155. The dielectric layer 780 includes topography related to the underlying topography formed by the semiconductor optical ridge waveguide section 155. Thus, a CMP process may optionally be used to planarize the surface of the dielectric layer 780.

FIG. 7F illustrates the optical phase tuner 500 after the dielectric layer 780 has been planarized to form a cladding layer 790. The cladding layer 790 is analogous to the first cladding layer 310 of FIG. 3. Additional steps to complete the optical phase tuner 500 may be performed in a manner analogous to the steps illustrated by FIGS. 4G and 4H. In some cases the processes used to form the vias 610 may need to be modified to accommodate the greater depth of the vias 610 relative to the vias 330.

FIG. 8 presents a method 800 of the disclosure, e.g. for forming an optical device such as the device 100. The method 800 is described without limitation with reference to the various elements of the previously described figures. The method 800 may be performed in an order other than the illustrated order.

In a first step 810, a conductive or semiconductive substrate, e.g. the substrate 120, is provided that has a semiconductor layer, e.g. the semiconductor layer 405, located thereover and a dielectric layer, e.g. the dielectric layer 125, located therebetween. Herein and in the claims, "provided" means that a device, substrate, structural element, etc., may be manufactured by the individual or business entity performing the disclosed methods, or obtained thereby from a source other than the individual or entity, including another individual or business entity. In some embodiments the substrate is an SOI wafer, e.g. the SOI wafer 410.

In a step 820 a ridge waveguide, such as the semiconductor optical ridge waveguide section 155, and a heater strip, such as the semiconductor heater strip 160, are formed from the semiconductor layer, with the semiconductor heater strip extending parallel to the ridge waveguide. In a step 830 the semiconductor layer is doped such that the semiconductor heater strip is configured to carry a current therein about parallel to the ridge waveguide. The semiconductor heater strip is electrically isolated from the ridge waveguide, e.g. by a semiconductor bridge 220.

In an optional step 840, at least two electrodes are formed that connect to the heater strip. In an optional step 850, a second semiconductor heater strip is formed that extends about parallel to the ridge waveguide. The second semiconductor heater strip is electrically isolated from the ridge waveguide and is located on an opposite side of the ridge waveguide than the first semiconductor heater strip. The second semiconductor heater strip is doped to carry a current therein.

In an optional step 860, a Mach-Zehnder interferometer is formed, with the ridge waveguide forming part of one optical waveguide arm of the Mach-Zehnder interferometer.

In an optional step 870, a current source such as the RF signal source 230 is configured to switch a temperature of the heater strip at a frequency of at least 1 MHz.

Optionally the semiconductor heater strip and the ridge waveguide are formed from contiguous portions of the semiconductor layer. Optionally the semiconductor heater strip has a conductivity at least about 1E4 times greater than the ridge waveguide. Optionally the semiconductor heater strip is separated from the ridge waveguide by a gap of about 500 nm or less. Optionally the semiconductor heater strip has a bottom surface that is located closer to the semiconductor substrate than a bottom surface of the ridge waveguide.

Those skilled in the art to which this application relates will appreciate that other and further additions, deletions, substitutions and modifications may be made to the described embodiments.

What is claimed is:

1. An apparatus, comprising:
 a conductive or semiconductive substrate;
 a dielectric layer located directly on said substrate;
 a semiconductor layer located directly on the dielectric layer, said semiconductor layer including a ridge waveguide and a heater strip extending parallel to said ridge waveguide, wherein said heater strip is electrically isolated from said ridge waveguide and is doped to carry a current therein about parallel to said ridge waveguide;
 a first electrode pad and a second electrode pad located on different parts of the heater strip wherein the current is carried between the first electrode pad and the second electrode pad in a direction about parallel to said ridge waveguide; and
 a third electrode pad located on the heater strip in between the first electrode pad and the second electrode pad, wherein a portion of the current is configured to be carried in a first direction through the heater strip from the first electrode pad to the third electrode pad and a different portion of the current is configured to be carried in a second direction, that is opposite the first direction, through the heater strip from the second electrode pad to the third electrode pad.

2. The apparatus of claim 1, wherein said heater strip has a conductivity at least about 1E4 times greater than said ridge waveguide.

3. The apparatus of claim 1, wherein the ridge waveguide is an intrinsic semiconductor.

4. The apparatus of claim 1, further comprising a second heater strip extending parallel to said ridge waveguide, said second heater strip being electrically isolated from said ridge waveguide and located on an opposite side of said ridge waveguide than said heater strip, the second heater strip being doped to carry a current therein.

5. The apparatus of claim 1, wherein said ridge waveguide has a first top surface and said heater strip has a second top surface that is about coplanar with said first top surface.

6. The apparatus of claim 1, further comprising a Mach-Zehnder interferometer, said ridge waveguide forming part of one optical waveguide arm of the Mach-Zehnder interferometer.

7. The apparatus of claim 1, wherein said heater strip and said ridge waveguide are formed from contiguous portions of said semiconductor layer.

8. The apparatus of claim 1, wherein said heater strip has a bottom surface that is located closer to said semiconductor substrate than a bottom surface of said ridge waveguide.

9. The apparatus of claim 1, wherein said heater strip is configured to change a temperature of said ridge waveguide at a frequency of at least 1 MHz.

10. A method, comprising
providing a conductive or semiconductive substrate having a semiconductor layer located thereover and a dielectric layer located therebetween;
forming from said semiconductor layer, a ridge waveguide and a heater strip extending parallel to said ridge waveguide;
doping said semiconductor layer such that said heater strip is configured to carry a current therein about parallel to said ridge waveguide, wherein said heater strip is electrically isolated from said ridge waveguide;
forming a first electrode pad and a second electrode pad located on different parts of the heater strip wherein the current is carried between the first electrode pad and the second electrode pad in a direction about parallel to said ridge waveguide; and
forming a third electrode pad on the heater strip in between the first electrode pad and the second electrode pad, wherein a portion of the current is configured to be carried in a first direction through the heater strip from the first electrode pad to the third electrode pad and a different portion of the current is configured to be carried in a second direction, that is opposite the first direction, through the heater strip from the second electrode pad to the third electrode pad.

11. The method of claim 10, wherein said heater strip has a conductivity at least about 1E4 times greater than said ridge waveguide.

12. The method of claim 10, wherein the ridge waveguide is an intrinsic semiconductor.

13. The method of claim 10, further comprising forming a second heater strip extending about parallel to said ridge waveguide, said second heater strip being electrically isolated from said ridge waveguide and located on an opposite side of said ridge waveguide than said first heater strip, said second heater strip being doped to carry a current therein.

14. The method of claim 10, wherein said ridge waveguide has a first top surface and said heater strip has a second top surface that is about coplanar with said first top surface.

15. The method of claim 10, further comprising forming a Mach-Zehnder interferometer, said ridge waveguide forming part of one optical waveguide arm of the Mach-Zehnder interferometer.

16. The method of claim 10, further comprising forming said heater strip and said ridge waveguide from contiguous portions of said semiconductor layer.

17. The method of claim 10, wherein said heater strip has a bottom surface that is located closer to said semiconductor substrate than a bottom surface of said ridge waveguide.

18. The method of claim 10, further comprising configuring a current source to switch a temperature of said heater strip at a frequency of at least 1 MHz.

* * * * *